United States Patent Office 2,893,607
Patented July 7, 1959

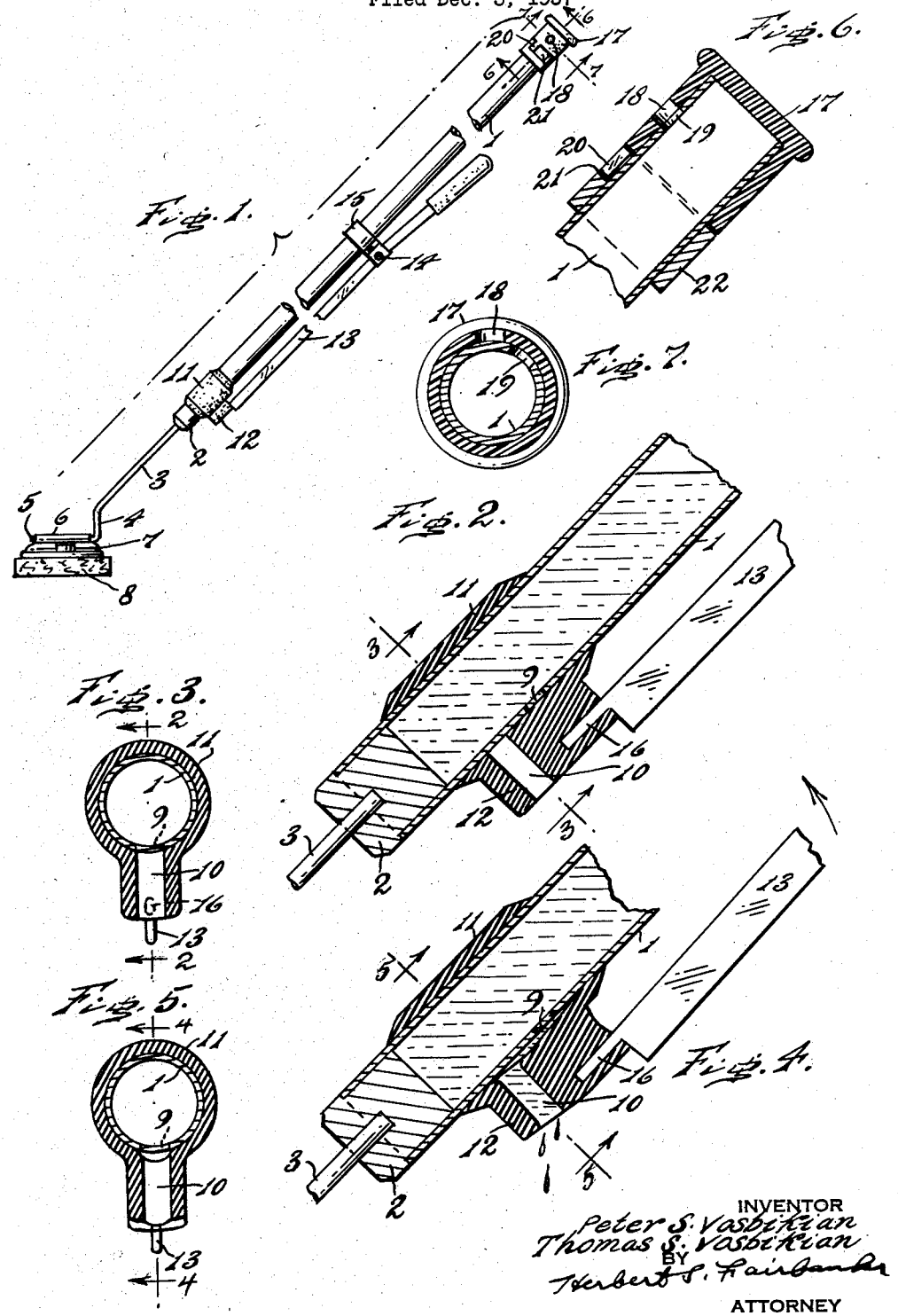

2,893,607

DEVICE FOR FEEDING LIQUID TO A WORKING TOOL

Peter S. Vosbikian and Thomas S. Vosbikian, Melrose, Pa.

Application December 3, 1957, Serial No. 700,428

4 Claims. (Cl. 222—191)

The object of our present invention is to devise a novel, manually controlled feeding device which will accurately control the feed of liquid from a source of liquid supply to a working tool, or applicator, and preferably to a surface in rear of such working tool or applicator.

A further object of this invention is to devise a novel resilient valve attachable to a tubular handle containing the liquid to be fed, said valve and handle having ports offset from each other and normally closed by contact of the valve with the handle, and said ports being placed in communication with each other by manually compressing a portion of the valve in a direction away from the handle.

A further object is to devise a novel valve in the form of a sleeve, the ends of which have a fluid tight contact with a tubular handle containing a liquid to be fed, and the portion between such ends being resilient and manually controlled to control discharge ports in the handle and valve.

With the foregoing and other objects in view as will hereinafter clearly appear, our invention comprehends a novel device to control feed of liquid from a source of supply to a working tool or applicator.

For the purpose of illustrating the invention, we have shown in the accompanying drawings a preferred embodiment of it which we have found, in practice, to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein set forth.

Figure 1 is a side elevation of a device for feeding liquid to a working tool, embodying our invention.

Figure 2 is a section on line 2—2 of Figure 3.

Figure 3 is a section taken on line 3—3 of Figure 2.

Figure 4 is a section taken on line 4—4 of Figure 5.

Figure 5 is a section taken on line 5—5 of Figure 4.

Figure 6 is a section taken on line 6—6 of Figure 1.

Figure 7 is a section taken on line 7—7 of Figure 1.

Similar numerals of reference indicate corresponding parts.

Referring to the drawings:

A tubular handle 1 contains the liquid to be fed, and is provided with a closure 2 at the front end of its bore. The handle has a rod portion 3 one end of which is connected with the closure in any desired manner. This rod portion near its front or inner end is bent at an angle as at 4 and terminates in a forward stretch 5 which is free to turn in a sleeve 6 carried by a head 7 to the bottom of which a block or pad of cleaning, waxing or polishing material is attached as shown at 8. Such material may be in the form of absorbent material, plastic, sponge rubber, cotton, wool, artificial fibres or any desired combination of such materials.

The tubular handle 1 has near the lower end of its bore a discharge port 9 opening through its side wall and offset relatively to a discharge port 10 opening through the side wall of a valve 11 of resilient material such as for example rubber or similar material. The valve is in the form of a sleeve mounted on and encircling the handle 1 with its end portions in sealed condition with the wall of the handle, and such sleeve has an enlarged boss 12 through which the port 10 extends.

The valve is manually controlled by a lever 13 pivoted at 14 to a band 15 fixed on the handle 1. The forward end of the lever is preferably of reduced size and extends into and is secured in the boss 12 as shown at 16.

An air vent may be provided at the outer end of the handle if desired. As shown a cap 17 is rotatable on the end of the handle and has a port 18 which can be brought into or out of register with a port 19 opening through a side wall of the handle. The cap has limited rotation in one direction or the other due to the provision of a finger 20 extending into a slot 21 in a band 22 fixed on the handle 1.

Assuming that the tubular handle has been filled with a desired liquid for example with liquid wax, the operator presses the upper end of the lever 13 which forms a grasping handle towards the handle 1 thereby causing the lower or inner end of the lever to move outwardly in a direction away from the handle 1. This causes the boss 12 to move outwardly from its sealing position shown in Figure 2 to the unsealed position shown in Figure 4. The liquid will feed from the handle 1 through discharge port 9 along the outer wall of the handle 1 to and through discharge port 10 and will drop on to the surface to be treated in rear of the applicator 8. When the operator releases the lever 13, the valve assumes its normal position seen in Figures 2 and 3 due to the resiliency of the material of which the valve sleeve is made. Thus, the valve acts as a spring to maintain the lever in its closed position.

The liquid will fed by gravity without an air vent at the upper end of the handle 1. If the air vent shown is used to provide increased pressure on the liquid, the cap 17 is turned to bring its port 18 into registry with port 19 in the handle 1.

Having thus described our invention, what we claim as new and desire to secure by Letters Patent is:

1. A tubular handle, a closure at the front end of the handle, said handle having a discharge port extending laterally through its side wall near the front end of the handle, a resilient valve sleeve encircling the handle and covering the handle discharge port, said sleeve having end portions sealed on the handle and having intermediate its end portions a discharge port adjacent to but longitudinally offset from said handle discharge port, and a valve actuating member mounted on the handle and connected with said valve sleeve to expand the sleeve portion at the ports away from the handle and effect communication between said ports.

2. The construction defined in claim 1, wherein said valve sleeve has an outwardly and laterally extending boss through which said valve sleeve discharge port extends.

3. The construction defined in claim 1, wherein said valve sleeve has a laterally extending boss, and said valve actuating member is a lever pivotally mounted on the handle and connected at one end with said boss.

4. The construction defined in claim 1, wherein a cap is rotatably adjustable on the rear end of the handle and said cap and handle have ports forming an air vent and controlled by partial rotation of the cap on the handle.

References Cited in the file of this patent

UNITED STATES PATENTS

| | | |
|---|---|---|
| 2,595,687 | McKendrick | May 6, 1952 |
| 2,607,067 | Minerley | Aug. 19, 1952 |
| 2,785,837 | Smith | Mar. 19, 1957 |